United States Patent

Amano et al.

[11] Patent Number: 6,166,466
[45] Date of Patent: *Dec. 26, 2000

[54] INSULATING MATERIAL FOR ENAMELED WIRE OF MOTOR OF REFRIGERATION COMPRESSOR

[75] Inventors: Satoshi Amano; Tomoki Nakamura; Takahiko Ito, all of Tokyo, Japan

[73] Assignee: Nisshinbo Industries, Inc., Tokyo, Japan

[*] Notice: This patent is subject to a terminal disclaimer.

[21] Appl. No.: 08/661,874

[22] Filed: Jun. 12, 1996

[30] Foreign Application Priority Data

Jun. 28, 1995 [JP] Japan ................................ 7-184796

[51] Int. Cl.$^7$ ............................. H02K 3/30; H02K 3/44; C08G 18/02
[52] U.S. Cl. ............................. 310/87; 310/88; 310/179; 428/423.1
[58] Field of Search ................. 310/52, 90, 87, 310/179, 88; 528/25; 62/468, 469; 428/423.1; 252/68

[56] References Cited

U.S. PATENT DOCUMENTS

| | | | |
|---|---|---|---|
| 4,883,837 | 11/1989 | Zabrocki | 525/66 |
| 4,968,777 | 11/1990 | Nakane et al. | 528/272 |
| 5,553,465 | 9/1996 | Fukuda et al. | 62/468 |
| 5,557,944 | 9/1996 | Hirano et al. | 62/469 |
| 5,607,719 | 3/1997 | Winkler et al. | 427/117 |
| 5,807,954 | 9/1998 | Becker et al. | 528/25 |
| 5,820,777 | 10/1998 | Schnur et al. | 252/68 |
| 5,833,876 | 11/1998 | Schnur et al. | 252/68 |
| 5,906,769 | 5/1999 | Schnur et al. | 252/68 |
| 5,939,200 | 8/1999 | Amano et al. | 428/423.1 |
| 5,976,399 | 11/1999 | Schnur et al. | 252/68 |

Primary Examiner—Clayton LaBalle
Attorney, Agent, or Firm—Kubovcik & Kubovcik

[57] ABSTRACT

The present invention provides an insulating material for the enameled wire of a motor of a refrigeration compressor using hydrofluorocarbons as the refrigerant and, as the refrigerating machine oil, a synthetic lubricating oil having at least one ester bond in a molecule such as ester-modified polyoxyalkylene glycol type, ester-modified ether type or ester type, which insulating material contains a compound having at least one carbodiimide group.

This insulating material for the enameled wire of a motor of a refrigeration compressor, which is free from the above-mentioned problems of the prior art, which can prevent the surface deterioration or peeling (blister or cracking) etc. seen in the conventional insulating material used for covering the enameled wire (e.g. magnet wire) of a refrigeration compressor, caused by a mixture of the hydrofluorocarbons and the synthetic lubricating oil both used in the compressor, which invites neither insulation breakdown nor reduction in insulation and has improved resistances to said substitute flon and said synthetic lubricating oil, and which further can impart deterioration resistance to the synthetic lubricating oil.

2 Claims, No Drawings

INSULATING MATERIAL FOR ENAMELED WIRE OF MOTOR OF REFRIGERATION COMPRESSOR

BACKGROUND OF THE INVENTION (1) Field of the Invention

The present invention relates to an insulating material for the enameled wire used as a magnet wire of a motor of a refrigeration compressor. More particularly, the present invention relates to an insulating material for the enameled wire of a motor of a refrigeration compressor, which has excellent resistances to the hydrofluorocarbons and specific refrigerating machine oil used in the refrigeration compressor and moreover imparts deterioration resistance to said refrigerating machine oil.

(2) Description of the Prior Art

Dichlorodifluoromethane ($CF_2Cl_2$) having no polarity has been mainly used as the refrigerant of the refrigerating cycle of electric refrigerators, refrigerating machines, air conditioners or the like; accordingly, a mineral oil type lubricating oil or the like has been mainly used as the refrigerating machine oil of said refrigerating cycle. Since the recent destruction of the ozone layer has prohibited the use of dichlorodifluoromethane containing chlorine atoms, only hydrofluorocarbons (hereinafter referred to as HFC) are coming to be used as a refrigerant.

HFC typified by HFC-134a, however, has poor compatibility with mineral oil type lubricating oils which have been used heretofore as the refrigerating machine oil, and there arises deposition of said lubricating oil at the low-temperature sites of the refrigerating cycle. As a result, the mineral oil type lubricating oil is not efficiently circulated in the refrigerating cycle, inviting reduction in lubricity and increase in wear of a compressor. Thus, a combination of HFC and mineral oil type lubricating oil is thought to have no practical applicability.

Hence, lubricating oils having at least one ester bond in a molecule such as ester-modified polyoxyalkylene glycol type, ether-modified ether type or ester type etc. (hereinafter referred to as synthetic lubricating oils) were proposed in place of the mineral oil type lubricating oils.

Meanwhile, HFC type refrigerants such as HFC-134a and the like are intended to be used in car air conditioners, electric refrigerators, etc. In electric refrigerators, (1) the refrigerating machine oil and the refrigerant both used therein are required to have good compatibility with each other; moreover, (2) since the motor is accommodated in the refrigerant system in most cases, it is necessary that the insulating material for covering the enameled wire, for example, the magnet wire of the accommodated motor, causes neither deterioration nor insulation breakdown and is stable over a long period of time.

However, the insulating materials currently used for covering the enameled wire of motors, such as formal resin, phenol-modified formal resin, polyester resin and the like, when placed in a refrigerant system using HFC type refrigerants, cause surface deterioration or peeling (blister or cracking) which result in their dissolution in the lubricating oil and/or refrigerant, etc., which invites poor insulation or insulation breakdown. Therefore, use of such an insulating material is not preferred.

Also, insulating materials such as polyamideimide, polyimide, polyester imide and the like, believed to have excellent performances, may undergo hydrolysis by the water contained in the synthetic lubricating oil used in combination with a substitute flon, to form an organic acid. The formed organic acid accelerates hydrolysis of ester bond in the synthetic lubricating oil molecule in a catalytic manner and causes deterioration of the synthetic lubricating oil; and this deterioration may invite reduction in refrigerating capacity. Thus, these insulating materials are not sufficient in quality.

OBJECT AND SUMMARY OF THE INVENTION

The object of the present invention is to provide an insulating material for the enameled wire of a motor of a refrigeration compressor, (1) which is free from the above-mentioned problems of the prior art, (2) which can prevent the surface deterioration or peeling (blister or cracking) etc. seen in the conventional insulating material used for covering the enameled wire (e.g. magnet wire) of a motor of a refrigeration compressor, caused by a mixture of the hydrofluorocarbons used as substitute flon and the synthetic lubricating oil, (3) which invites neither insulation breakdown nor reduction in insulation and has improved resistances to said hydrofluorocarbons and synthetic lubricating oil, and (4) which further can impart deterioration resistance to the synthetic lubricating oil.

The present inventors made a study in order to solve the problems of the prior art. As a result, the present inventors found out that the above object can be achieved by applying a compound having at least one carbodiimide group, on an insulating material for enameled wire (e.g. magnet wire). The finding has led to the completion of the present invention.

According to the present invention, there is provided an insulating material for the enameled wire of a motor of a refrigeration compressor using hydrofluorocarbons as the refrigerant and, as the refrigerating machine oil, a synthetic lubricating oil having at least one ester bond in a molecule such as an ester-modified polyoxyalkylene glycol type, ester-modified ether type or ester type, which insulating material contains a compound having at least one carbodiimide group.

DETAILED DESCRIPTION OF THE INVENTION

The present invention is hereinafter described in detail.

The compound having at least one carbodiimide group, used in the present invention includes, for example, compounds represented by the following formula (1):

 (1)

(wherein $R_1$ is an isocyanate residue, and $n_1$ is an integer of 1–100); compounds represented by the following formula (2):

 (2)

(wherein $R_2$ is an isocyanate residue; $R_3$ and $R_4$ are each a terminal group; and $n_2$ is an integer of 1–100); compounds represented by the following formula (3):

 (3)

(wherein Y is a residue of a compound having a functional group reactive with isocyanate; $R_5$ is an isocyanate residue; $R_6$ is an isocyanate residue, or a residue of a compound having a functional group reactive with a compound being able to give the residue Y; and $n_3$ and m are each an integer of 1–100); and compounds represented by the following formula (4):

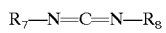　(4)

(wherein $R_7$ and $R_8$ are each a terminal group).

$R_1$ of the formula (1) can be exemplified by the following groups:

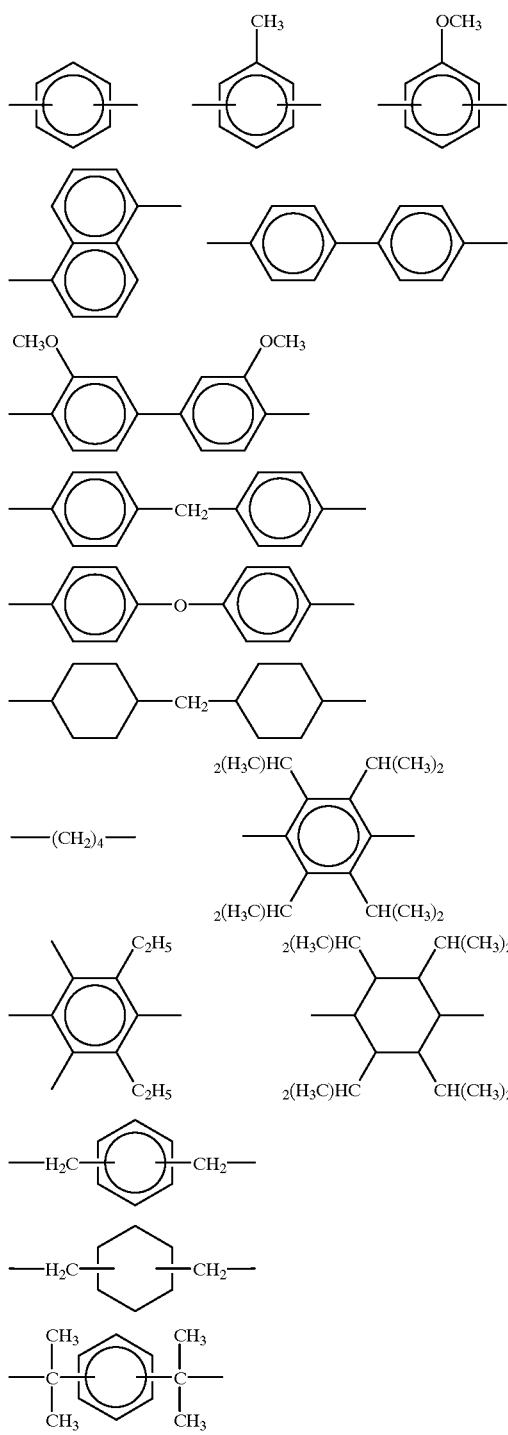

$n_1$ of the formula (1) is an integer of 1–100. More specifically, the formula (1) refers to a compound in which the isocyanate residue is not detected by infrared (IR) spectrum. In case that the isocyanate residue is detected by IR spectrum, the compound could be represented by the following formula:

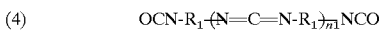

(wherein $R_1$s may be the same or different). The same applies to the above-mentioned formula (3).

$R_3$ and $R_4$ of the formula (2) are each a terminal group including, for example, monoisocyanate residues having structures such as the following:

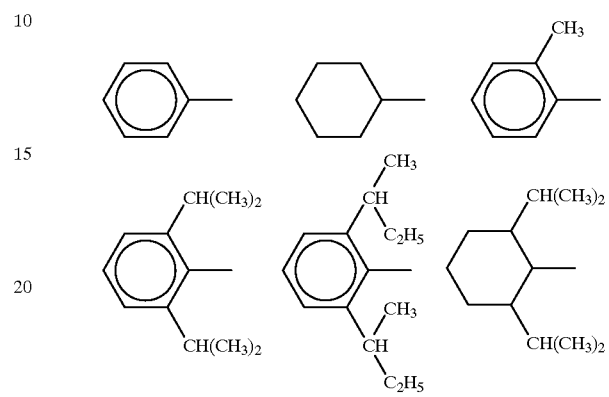

or functional groups such as —$NH_2$, —NHX (X is an alkyl group), —COOH, —SH, —OH and the like, or residues of the reaction between a compound having a functional group reactive with isocyanate and isocyanate, such as follows:

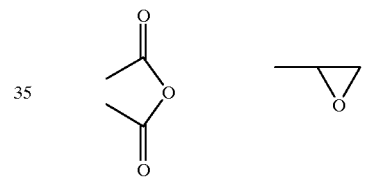

$n_2$ of the formula (2) is an integer of 1–100. $R_2$ of the formula (2) can be exemplified by the same groups as mentioned with respect to $R_1$ of the formula (1).

Y of the formula (3) is a residue of a compound having a functional group reactive with isocyanate, and can be exemplified by the following structures:

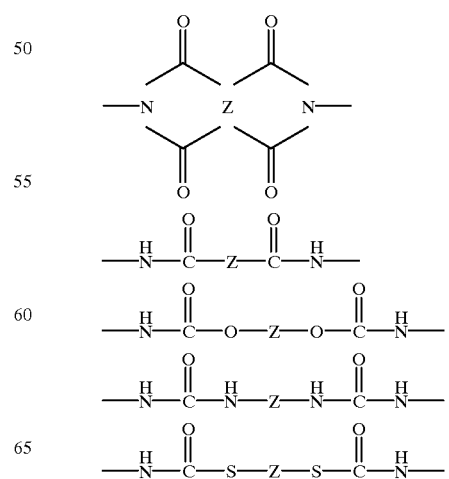

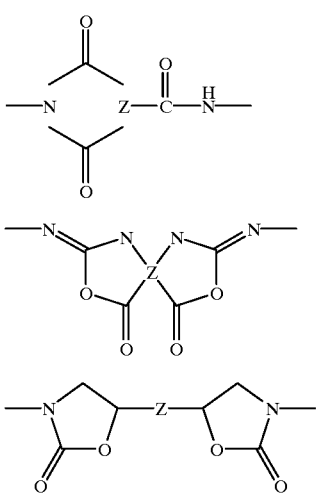

(wherein Z is an alkylene group; a bivalent cycloalkyl group which may have a substituent(s); a bivalent aryl group which may have a substituent(s); or one of the following groups, each of which may have substituents such as lower alkyl groups, lower alkoxy groups and the like:

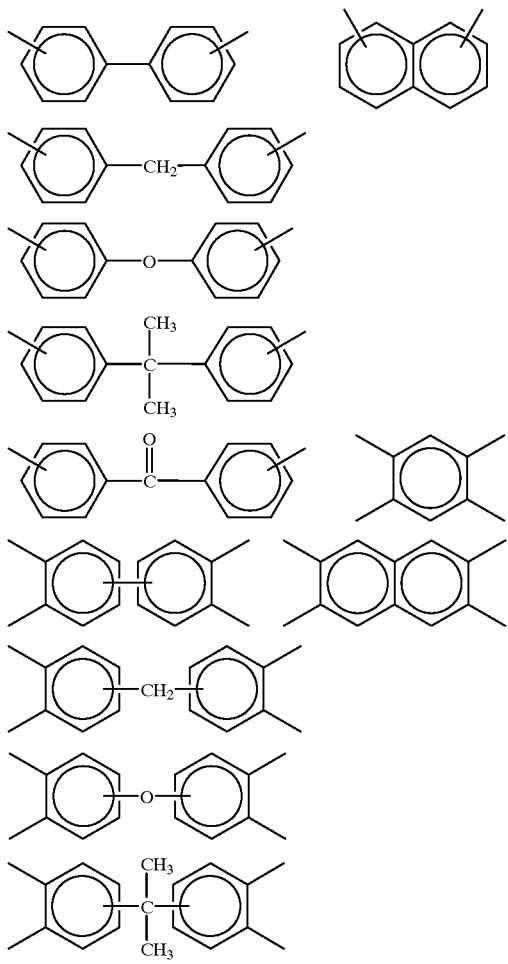

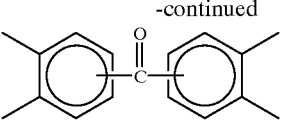

That is, the compound represented by the formula (3) is a carbodiimide copolymer of (1) a compound obtained by a reaction between a compound which gives the above-mentioned residue Y and an isocyanate group, and (2) the compound having at least one carbodiimide group. $n_2$ and m of the formula (3) are each an integer of 1–100. $R_5$ of the formula (3) can be exemplified by the same groups as mentioned with respect to $R_1$ of the formula (1). $R_6$ of the formula (3) can be exemplified by the same groups as mentioned with respect to $R_1$ of the formula (1), or by the same groups as mentioned with respect to Z of the formula (3).

The compound represented by the formula (4) corresponds to a compound of the formula (2) obtained by a reaction of monoisocyanates wherein $n_2$ is 1. $R_7$ and $R_8$ which is each a terminal group of the formula (4) are each a monoisocyanate residue, and can be exemplified by the same monoisocyanate residue groups as mentioned with respect to $R_3$ and $R_4$ of the formula (2). $R_7$ and $R_8$ may be the same or different.

The insulating material of the present invention for the enameled wire of a refrigeration compressor is used by adding the above-mentioned compound having at least one carbodiimide group, to a conventional insulating material to be applied on the enameled wire of a refrigeration compressor, or by coating said compound on the outer surface of said enameled wire.

When the compound having at least one carbodiimide group is added to a conventional insulating material to be applied on the enameled wire of a refrigeration compressor, the amount of the compound added to the insulating material is 0.05–50 parts by weight, preferably 0.1–30 parts by weight per 100 parts by weight (as solid) of the insulating material. When the amount is less than 0.05 parts by weight, no intended addition effect is obtained. When the amount is more than 50 parts by weight, there occur cases that no higher effect is seen and that the properties of the resulting film are impaired.

The insulating material to which the present compound having at least one carbodiimide group is added, can be known insulating materials and includes, for example, a polyimide, a polyamideimide, a polyester imide modified with tris-2-hydroxyethyl isocyanurate, a polyester amideimide modified with tris-2-hydroxyethyl isocyanurate, a polyester modified with tris-2-hydroxyethyl isocyanurate, polyhydantoin and polyparabanic acid.

When the compound having at least one carbodiimide group is coated on the outer surface of enameled wire, the compound is preferably a compound of the formula (3) and, in view of the film formability, particularly a compound of the formula (3) wherein $100 \geq n_3 \geq 10$ and $10 > m \geq 1$, preferably $100 \geq n_3 \geq 20$ and $10 > m \geq 1$ or a compound of the formula (3) wherein $10 > n_3 > 1$ and $100 \geq m \geq 10$, preferably $10 > n_3 \geq 1$ and $100 \geq m \geq 15$ or a compound of the formula (3) wherein $100 \geq n_3 > 10$ and $100 \geq m \geq 10$, preferably $100 \geq n_3 \geq 20$ and $100 \geq m \geq 15$.

The insulating material of the present invention containing a compound having at least one carbodiimide group, as compared with conventional insulating materials, has high resistances to synthetic lubricating oil and refrigerant owing to the action of the carbodiimide group and prevents surface deterioration or peeling (blistering or cracking).

Above action of the carbodiimide group is assumed as follows. That is, ester bond portion of refrigerating machine oil undergoes hydrolysis by the water contained in the refrigerating machine oil to form an organic acid; or ester group, imide group or amide group of insulating material undergoes hydrolysis to form an organic acid (especially, low-molecular compound of the insulating material may easily undergo hydrolysis and dissolve into the refrigerating machine oil); thus formed organic acid acts as a catalyst for above hydrolysis and accelerates deterioration of the refrigerating machine oil and the insulating material; and this acceleration is the principal reason for the deterioration of the refrigerating machine oil and the insulating material. However, when carbodiimide group exists in the system, the carbodiimide group directly captures the formed organic acid owing to the reactivity of the carbodiimide group with a compound having active hydrogen. In addition, the carbodiimide group acts as a dehydration-condensation agent to bond hydrolysed ester bond again. Accordingly, the carbodiimide group prevents the deterioration of the refrigerating machine oil and the insulating material.

Further, in the insulating material of the present invention, the carbodiimide group present on the surface of or inside said insulating material captures (1) acidic components (e.g. carboxylic acid, hydrogen halide and phosphoric acid) formed by the decomposition of synthetic lubricating oil, refrigerant and additives and (2) the water present in the refrigerant system from before the ester bond of synthetic lubricating oil is hydrolyzed, whereby an increase in oxidation number in the refrigerant system is prevented.

The present invention is hereinafter described specifically by way of Examples. However, the present invention is not restricted to these Examples.

The following compounds having at least one carbodiimide group were used in the following Examples.

Compound 1

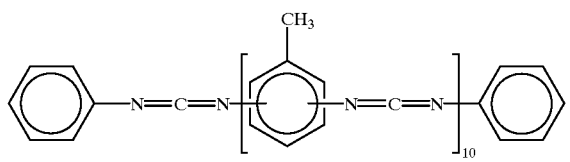

Compound 2

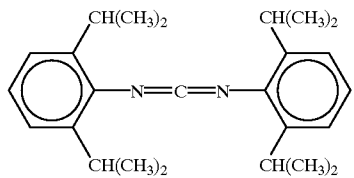

Compound 3

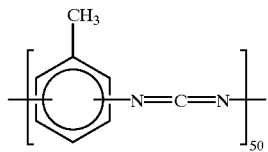

Compound 4

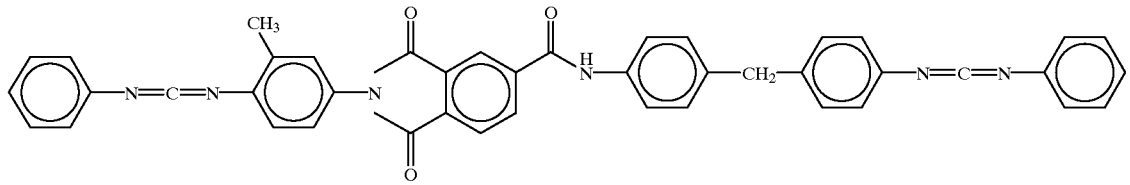

Compound 5

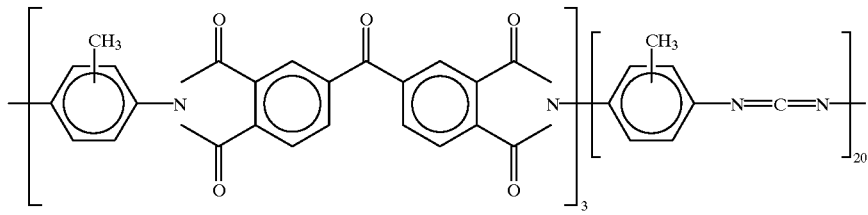

Compound 6

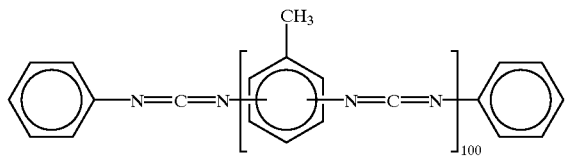

-continued
Compound 7
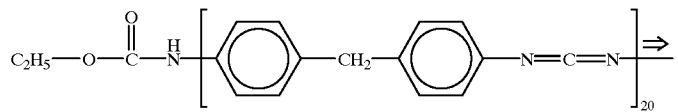
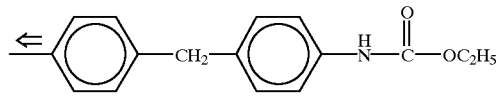
Compound 8
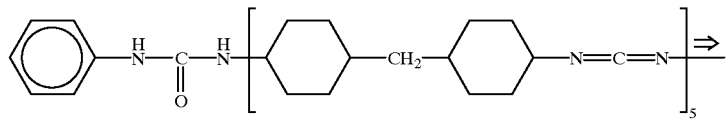
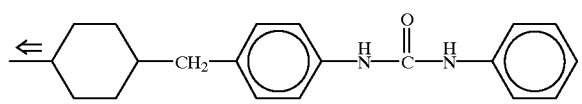
Compound 9
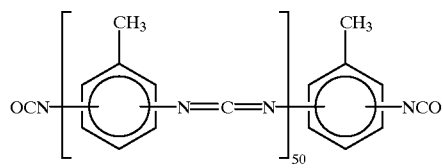
Compound 10
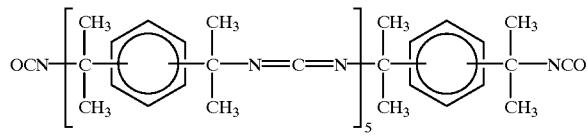
Compound 11
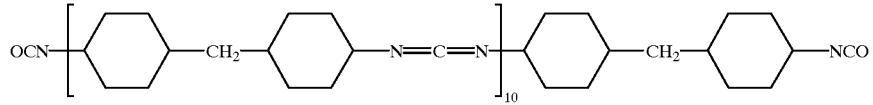
Compound 12
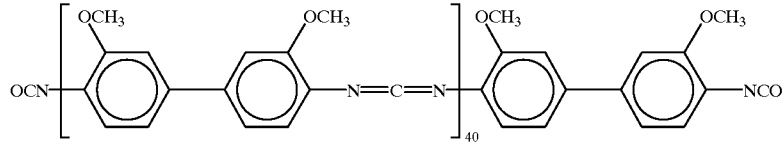
Compound 13
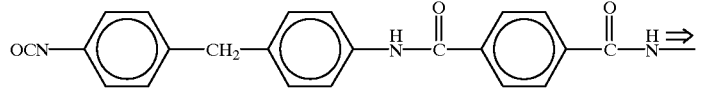
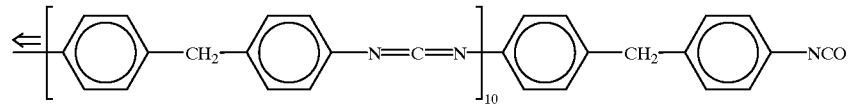
Compound 14
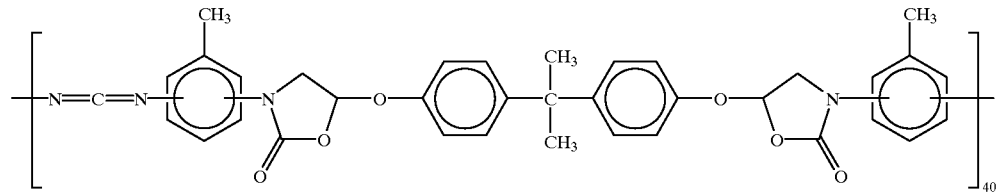

-continued

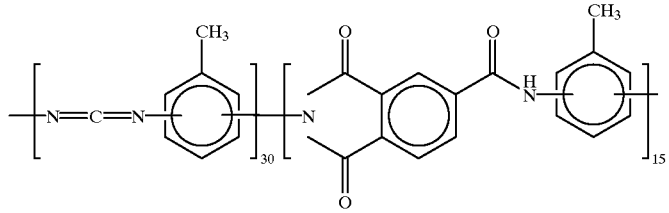

Compound 15

In the following Examples, there was also used, as a synthetic lubricating oil, an ester oil usable in combination with HFC-134a.

EXAMPLE 1 AND 2

An N-methyl-pyrrolidone solution containing 30% of the compound 1 or 8 was added to a commercial polyamide-imide varnish for coating of electric wire (an N-methyl-pyrrolidone solution containing 20% of a polyamideimide) so that the proportion of the compound 1 or 8 became 5 parts by weight (as solid) per 100 parts by weight (as solid) of the polyamideimide varnish, whereby an insulating varnish was prepared. This varnish was coated on an electric wire; the coated electric wire was subjected to solvent removal; and then, annealing was conducted to produce an enameled wire (1) and (2).

EXAMPLE 3

An N-methyl-pyrrolidone solution containing 20% of the compound 1 was added to a commercial polyamideimide varnish for coating of electric wire (an N-methyl-pyrrolidone solution containing 20% of a polyamideimide) so that the proportion of the compound 1 became 30 parts by weight (as solid) per 100 parts by weight (as solid) of the polyamideimide varnish, whereby an insulating varnish was prepared. This varnish was coated on an electric wire; the coated electric wire was subjected to solvent removal; and then, annealing was conducted to produce an enameled wire (3).

EXAMPLE 4 AND 5

The compound 2 or 10 was added to a commercial polyesterimide varnish for coating of electric wire (an N-methyl-pyrrolidone solution containing 20% of a polyamideimide) so that the proportion of the compound 2 or 10 became 3 parts by weight per 100 parts by weight (as solid) of the polyesterimide varnish, whereby an insulating varnish was prepared. An electric wire was immersed in this varnish, and the resulting electric wire was subjected to solvent removal for solidification of varnish, to produce an enameled wire (4) and (5).

EXAMPLE 6

A commercial magnet wire (a polyester-nylon wire) for electric refrigerator was immersed in a perchloroethylene solution containing 5% of the compound 3; the resulting magnet wire was subjected to solvent removal; and then, annealing was conducted to produce an enameled wire (6) surface-coated with the compound 3.

EXAMPLE 7

An N-methyl-pyrrolidone solution containing 25% of the compound 4 was added to an N-methyl-pyrrolidone solution containing 25% of a commercial polyamideimide, in an amount of 7 parts by weight per 100 parts by weight (as solid) of the latter solution, whereby an insulating varnish was prepared. An electric wire was immersed in this varnish; the resulting electric wire was subjected to solvent removal; and then, annealing was conducted to produce an enameled wire (7).

EXAMPLE 8

An N-methyl-pyrrolidone solution containing 25% of the compound 11 was added to an N-methyl-pyrrolidone solution containing 25% of a commercial polyamideimide, in an amount of 4 parts by weight per 100 parts by weight (as solid) of the latter solution, whereby an insulating varnish was prepared. An electric wire was immersed in this varnish; the resulting electric wire was subjected to solvent removal; and then, annealing was conducted to produce an enameled wire (8).

EXAMPLE 9

27 g of a commercial polyamideimide powder was dissolved in 100 g of an N-methyl-pyrrolidone solution containing 3% of the compound 5, to prepare an insulating varnish. An electric wire was immersed in this varnish; the resulting electric wire was subjected to solvent removal; and then, annealing was conducted to produce an enameled wire (9).

EXAMPLE 10–12

A commercial magnet wire base for electric refrigerator was immersed in a perchloroethylene solution containing 5% of the compound 3, 6 or 9; the resulting base was subjected to solvent removal; and then, annealing was conducted to produce an enameled wire (10), (11) and (12) surface-coated with the compound 3, 6 or 9.

EXAMPLE 13 AND 14

A commercial magnet wire base for electric refrigerator was immersed in an N-methyl-pyrrolidone solution containing 5% of the compound 14 or 15; the resulting base was subjected to solvent removal; and then, annealing was conducted to produce an enameled wire (14) and (15) surface-coated with the compound 14 or 15.

EXAMPLE 15

A commercial enameled wire covered by polyesterimide was immersed in a tetrahydrofran solution containing 5% of the compound 12; the resulting enameled wire was subjected to solvent removal; and then, annealing was conducted to produce an enameled wire (15) surface-coated with the compound 12.

EXAMPLE 16

An N-methyl-pyrrolidone solution containing 10% of the compound 13 was added to an N-methyl-pyrrolidone solution containing 10% of a commercial polyamideimide, in an amount of 1 parts by weight per 100 parts by weight (as solid) of the latter solution, whereby an insulating varnish was prepared. An electric wire was immersed in this varnish; the resulting electric wire was subjected to solvent removal; and then, annealing was conducted to produce an enameled wire (16).

EXAMPLE 17

A commercial enameled wire covered by polyesterimide was immersed in a tetrahydrofran solution containing 5% of the compound 7; the resulting enameled wire was subjected to solvent removal; and then, annealing was conducted to produce an enameled wire (17) surface-coated with the compound 7.

COMPARATIVE EXAMPLE 1

There was used, as an enameled wire, a commercial magnet wire (a polyester-nylon wire) for electric refrigerator.

COMPARATIVE EXAMPLE 2

An electric wire was immersed in an N-methyl-pyrrolidone solution containing 25% of a commercial polyamideimide; the resulting electric wire was subjected to solvent removal; and then, annealing was conducted to produce an enameled wire (18) coated with a polyamideimide.

Comparison Tests 3 g of one of the enameled wires obtained in Examples 1–17 and Comparative Examples 1–2 was placed in an autoclave. Therein were also placed HFC-134a (a refrigerant), 40 g/300 ml of an ester oil (a synthetic lubricating oil) usable in combination with HFC-134a, and 1,000 ppm of water. Then, the autoclave was tightly sealed and heated at 175° C. for 14 days. Thereafter, the enameled wire was measured for cracking and the ester oil was measured for total acid value. The results are shown in Table 1.

TABLE 1

| | Sample evaluated | Cracking | Total oxidation number (mg KOH/g) |
|---|---|---|---|
| Example 1 | Enameled wire (1) | Δ | 0.03 |
| Example 2 | Enameled wire (2) | ◯ | 0.02 |
| Example 3 | Enameled wire (3) | ◯ | 0.01 |
| Example 4 | Enameled wire (4) | ◯ | 0.02 |
| Example 5 | Enameled wire (5) | ◯ | 0.02 |
| Example 6 | Enameled wire (6) | ◯ | 0.01 |
| Example 7 | Enameled wire (7) | ◯ | 0.01 |
| Example 8 | Enameled wire (8) | ◯ | 0.03 |
| Example 9 | Enameled wire (9) | ◯ | 0.01 |
| Example 10 | Enameled wire (10) | ◯ | 0.01 |
| Example 11 | Enameled wire (11) | ◯ | 0.01 |
| Example 12 | Enameled wire (12) | ◯ | 0.02 |
| Example 13 | Enameled wire (13) | ◯ | 0.02 |
| Example 14 | Enameled wire (14) | ◯ | 0.01 |
| Example 15 | Enameled wire (15) | ◯ | 0.02 |
| Example 16 | Enameled wire (16) | ◯ | 0.02 |
| Example 17 | Enameled wire (17) | ◯ | 0.01 |
| Comparative Example 1 | Commercial product | X | 0.08 |

TABLE 1-continued

| | Sample evaluated | Cracking | Total oxidation number (mg KOH/g) |
|---|---|---|---|
| Comparative Example 2 | Enameled wire (18) | Δ | 0.05 |
| — | Ester oil alone | — | 0.01 |

The symbols in Table 1 refer to the followings:
◯: No cracking
Δ: A small number of cracks
X: A large number of cracks As is clear from Table 1, the insulating material of the present invention, as compared with conventional products, can allow the enameled wire for refrigeration compressor to have high resistances to refrigerating machine oil and refrigerant, can suppress cracking of enameled wire, and can prevent increase in acid value in refrigerant system.

What is claimed is:

1. A refrigeration unit comprising a refrigeration compressor using hydrofluorocarbons as a refrigerant; a motor for driving the refrigeration compressor and including an enameled wire as a magnet wire of the motor; and a refrigerating machine oil in contact with the enameled wire and compressor and which is a synthetic lubricating oil having at least one ester bond in a molecule, said enameled wire being coated with an insulating material containing a compound having at least one carbodiimide group represented by the following formula (1):

$$\text{\textendash}(N=C=N-R_1)_{\overline{n_1}} \tag{1}$$

wherein $R_1$ is an isocyanate residue, and $n_1$ is an integer of 1–100;
or by the following formula (2):

$$R_3-R_2-(N=C=N-R_2)_{\overline{n_2}}R_4 \tag{2}$$

wherein $R_2$ is an isocyanate residue, $R_3$ and $R_4$ are each a terminal group; and $n_2$ is an integer of 1–100;
or by the following formula (3):

$$\text{\textendash}(N=C=N-R_5)_{\overline{n_3}}(Y-R_6)_{\overline{m}} \tag{3}$$

wherein Y is a residue of a compound having a functional group reactive with isocyanate; $R_5$ and $R_6$ are each an isocyanate residue; and $n_3$ and m are each an integer of 1–100;
or by the following formula (4):

$$R_7-N=C=N-R_8 \tag{4}$$

wherein $R_7$ and $R_8$ are each a terminal group.

2. The refrigeration unit according to claim 1, wherein the insulating material contains 0.05–50 parts of said compound having at least one carbodiimide group per 100 parts by weight, as solids, of said insulating material.

* * * * *